July 28, 1925.
H. ANDRIESSENS
1,547,714
PROCESS FOR CARRYING OUT ENDOTHERMIC GAS REACTIONS
Filed Feb. 16, 1922
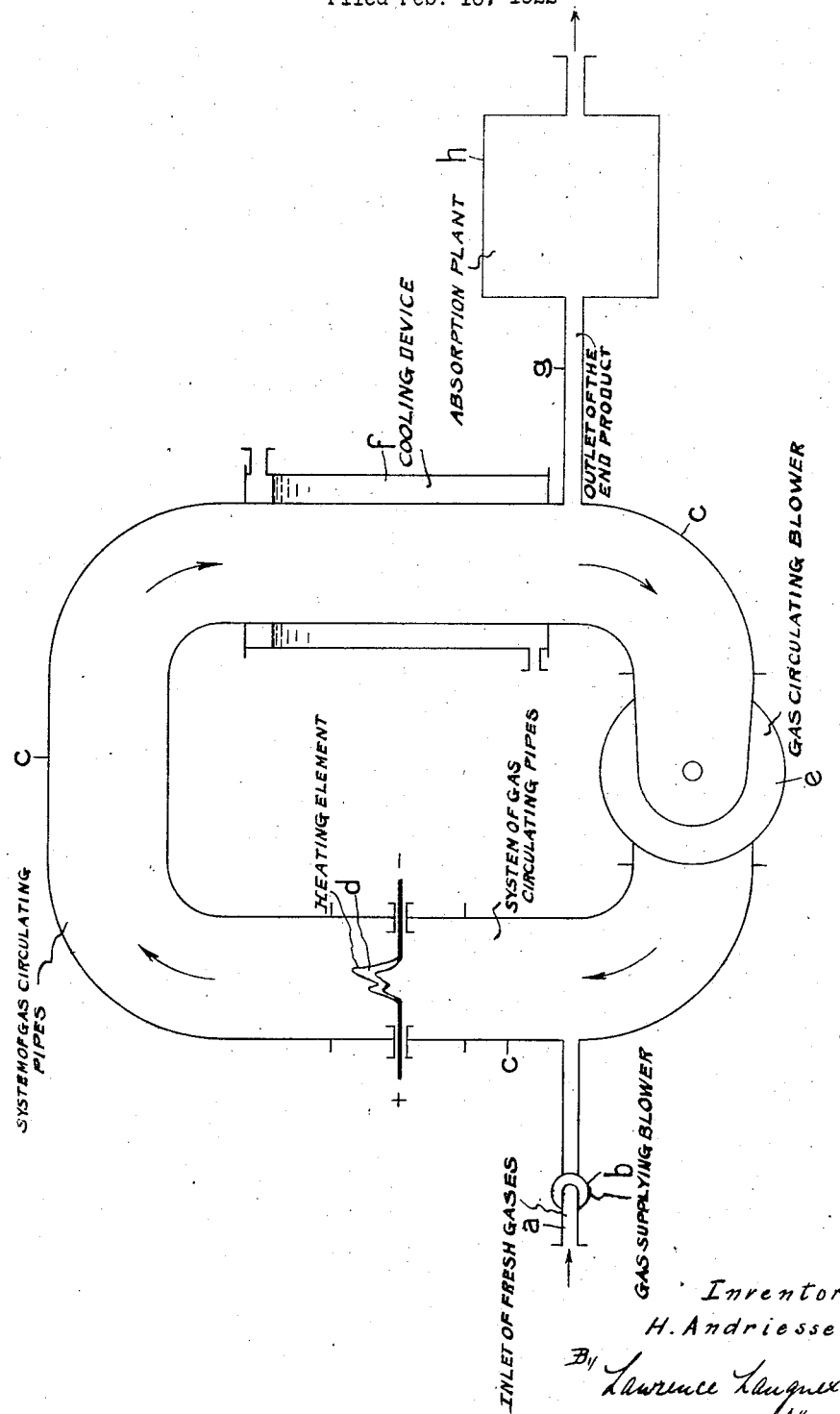

Patented July 28, 1925.

1,547,714

UNITED STATES PATENT OFFICE.

HUGO ANDRIESSENS, OF ZURICH, SWITZERLAND, ASSIGNOR OF ONE-HALF TO THE FIRM: SOCIETY OF CHEMICAL INDUSTRY IN BASLE, OF BASEL, SWITZERLAND.

PROCESS FOR CARRYING OUT ENDOTHERMIC GAS REACTIONS.

Application filed February 16, 1922. Serial No. 537,012.

*To all whom it may concern:*

Be it known that I, HUGO ANDRIESSENS, a subject of the Queen of Netherlands, and resident of Zurich, Switzerland, have invented a new Process for Carrying Out Endothermic Gas Reactions, of which the following is a full, clear, and exact specification.

It is known, that gas reactions carried out with the aid of the electric arc or other heating elements give yields, which are the greater the steeper is the temperature fall of the gases leaving the heating zone. For this reason it is advantageous to lead the gas to bring to reaction with a speed as great as possible through the heating zone. But in the practice this was heretofore only feasible until a certain degree, since the speed of the current diminishes the concentration, that is to say, in other words, for the reason that, although per unity of energy and of time, more reaction product is obtained, this product is so diluted in the large quantity of gas led through the furnace that its subsequent absorption meets with too great difficulties.

The object of the present invention is a process permitting to move the reaction gases with any desirable speed through the heating zone and to utilize consequently the strong temperature fall resulting therefrom, without that on the other hand an excessive dilution of the reaction product takes place.

The new process consists in the following: Instead to conduct the gases to bring to reaction, after they have passed once through the heating element, immediately to the absorption, the whole gas mass is brought to circulate continuously and quickly, several times, through the heating element and cooled down each time after they leave the heating element. Thus is produced on the other hand, behind the heating element a very strong temperature fall and on the other hand the whole circulating quantity of gas is by its repeated passages through the heating element, successively enriched so intensely with reaction product that there results a mixture which seems no more excessively diluted and does consequently not oppose any difficulty to the absorption.

The accompanying drawing shows a scheme of a plant capable of being employed for carrying out the invention.

*a* is a pipe through which the gas to bring to reaction is pressed by a blower *b* in a closed system of gas circulating pipes *c*. In this system of pipes *c* is inserted a heating element *d* as for instance an electric arc device and an accordingly greater blower *e*. A part of the system of pipes *c* passes itself through a cooling device *f*. A pipe *g* serves to lead the gases finally to an absorption plant *h*. By the blower *e* the whole gas mass contained in the closed system of pipes *c* receives a quick movement and circulates continuously through the same, the gas passes through the electric arc, then through the cooled part of the system of pipes *c*, afterwards through the blower *e*, again through the electric arc and so forth until the desired enrichment of the gas with reaction product is attained.

In the practice the described process can be carried out in intervals, that is to say, the described circulation of a determined quantity of gas through the system of pipes can be conducted to end and afterwards the same be led to the absorption plant and the circulation of a new quantity of gas through the system of pipes be brought about and so forth. But the gas circulation can also be a continuous one, in such a manner that during the said circulation continuously new gas is introduced in the system of pipes *c* and let to diffuse into the whirling gas mass contained therein, whilst on the other hand continuously a quantity of gas corresponding to the quantity of new gas introduced in the circulating cycle is led out and conducted in the absorption plant.

By the employment of speeds of any height for the gas current it becomes possible to introduce in the circulating cycle not only gases but also solid substances, for the purpose either of increasing the temperature fall in consequence of their increased heat capacity or of their participation to the reaction.

As an example of the use of the new process, there is hereafter described its application to the production of nitrogen oxides.

The closed system of pipes *c* and the blower *e* inserted therein are filled with mixture of nitrogen and oxygen containing for example $33\frac{1}{3}$ per cent in volume of nitrogen and $66\frac{2}{3}$ per cent in volume of oxygen. By means of the blower *e* this gas mixture is caused to circulate quickly through the pipe system c, so that it passes at d through the electric arc with a speed of about 20 to 25 meters per second. Under the influence of the electric arc due to the high temperature prevailing therein, there is formed nitrogen oxide according to the formula $N_2+O_2=2NO$, in rapidly increasing quantities by the continuous circulation of the reaction gases through the arc. In order to replace the quantities of nitrogen and of oxygen consumed by the formation of NO, some fresh mixture of nitrogen and oxygen is continuously introduced in the pipe system c by means of the blower b. A corresponding gas volume is led out of the pipe system c through the outlet g and is freed from $NO_2$ in the absorption plant h, after it has been previously passed through the oxidizing room, in which the NO combined with the excess oxygen to $NO_2$. The gases not absorbed in h are advantageously returned to the inlet a and conducted again therefrom mixed with fresh nitrogen and fresh oxygen, in the pipe system c. Obviously it would be possible to insert in the pipe system c, instead of only one electric arc device d, several of such electric arc devices, for example three, each connected to two of the three conductors supplying the heating device with a triphasic alternating current, whereby a supplementary cooling device would be inserted between each couple of successive electric arcs.

What I claim is:

1. In a process for carrying out endothermic gas reactions wherein the gases are maintained in continual circulation through a heating device and a subsequent cooling path, the steps which consist in circulating the gases at a speed so high that under the influence of the excess of non-combined gases the gas mixture immediately after it leaves the heating device and previous to its entrance in the cooling path is brought down every time to a temperature below that at which any considerable percentage of the reaction products and starting materials would dissociate or decompose, continuously removing by means of a lateral circuit a part of the mass in circulation and introducing a corresponding quantity of fresh gases into the circulation.

2. In a process for carrying out endothermic gas reactions wherein the gases are maintained in continual circulation through a heating device and a subsequent cooling path, the steps which consist in circulating the gases at a speed so high that under the influence of the excess of non-combined gases the gas mixture immediately after it leaves the heating device and previous to its entrance in the cooling path is brought down every time to a temperature below that at which any considerable percentage of the reaction products and starting materials would dissociate or decompose, continuously removing by means of a lateral circuit a part of the mass in circulation, which is freed from reaction products and thereafter reintroduced in the principal circuit and, in order to replace the gases bound in the eliminated reaction products, introducing a corresponding quantity of fresh gases into the said principal circuit.

3. In a process for carrying out endothermic gas reactions wherein the gases are maintained in continual circulation through a heating device and a subsequent cooling path, the steps which consist in circulating the gases at a speed so high that under the influence of the excess of non-combined gases the gas mixture immediately after it leaves the heating device and previous to its entrance in the cooling path is brought down every time to a temperature below that at which any considerable percentage of the reaction products and starting materials would dissociate or decompose, continuously removing by means of a lateral circuit a part of the mass in circulation, which is freed from reaction products and thereafter reintroduced in the principal circuit and, in order to replace the gases bound in the eliminated reaction products, introducing a corresponding quantity of fresh gases into the said principal circuit through the lateral circuit.

4. In a process for carrying out endothermic gas reactions wherein the gases are maintained in continual circulation through a heating device and a subsequent cooling path, the steps which consist in circulating the gases at a speed so high that under the influence of the excess of non-combined gases the gas mixture immediately after it leaves the heating device and previous to its entrance in the cooling path is brought down every time to a temperature below that at which any considerable percentage of the reaction products and starting materials would dissociate or decompose, continuously removing by means of a lateral circuit a part of the mass in circulation, which is freed from reaction products and thereafter reintroduced in the principal circuit and, in order to replace the gases bound in the eliminated reaction products, introducing a corresponding quantity of fresh gases into the said principal circuit in part directly, in part through the lateral circuit.

In witness whereof I have hereunto signed my name this 28th day of January 1922, in the presence of two subscribing witnesses.

HUGO ANDRIESSENS.

Witnesses:
F. HEIM,
D. GRAF.